United States Patent [19]
Ando et al.

[11] Patent Number: 4,660,899
[45] Date of Patent: Apr. 28, 1987

[54] HYDRAULIC ANTI-SKID APPARATUS FOR AUTOMOTIVE VEHICLES

[75] Inventors: Masamoto Ando; Hiroaki Takeuchi, both of Toyota; Toyohisa Yamada, Anjo; Toshihiko Yamanaka, Toyota, all of Japan

[73] Assignees: Aisin Seiki Kabushiki Kaisha, Kariya; Toyota Jidosha Kabushiki Kaisha, Toyota, both of Japan

[21] Appl. No.: 781,889

[22] Filed: Sep. 30, 1985

[30] Foreign Application Priority Data

Sep. 28, 1984 [JP] Japan .................. 59-148183[U]

[51] Int. Cl.$^4$ .............................................. B60T 8/02
[52] U.S. Cl. .................................. 303/115; 303/113
[58] Field of Search ............... 303/115, 113, 116, 119

[56] References Cited

U.S. PATENT DOCUMENTS 4,036,534  7/1977  Kondo et al. ................... 303/115 X
4,316,642  2/1982  Belart ................................ 303/116

Primary Examiner—Duane A. Reger
Assistant Examiner—Matthew C. Graham
Attorney, Agent, or Firm—Oblon, Fisher, Spivak, McClelland & Maier

[57] ABSTRACT

A hydraulic anti-skid apparatus for automotive vehicles includes a cut-off valve disposed within a braking circuit connecting a master cylinder to a wheel brake cylinder, a bypass valve disposed within a bypass passage of the braking circuit, first and second pistons respectively arranged to control opening and closing operations of the cut-off valve and the bypass valve, the first and second pistons each being arranged to be applied at one end thereof with a hydraulic braking pressure from the master cylinder and at the other end thereof with a hydraulic power pressure from a fluid pump, a solenoid valve arranged to apply the power pressure to the first piston in its deactivated condition and to connect the first piston to a fluid reservoir in its activated condition, a regulator valve arranged to control the power pressure applied to the first and second pistons in accordance with the braking pressure applied thereto, the regulator valve including a booster piston assembly having a small diameter portion applied with the power pressure and a large diameter portion applied with the braking pressure. The regulator valve acts to cooperate with a check valve in response to movement of the booster piston assembly thereby to produce a hydraulic pressure at a higher value than the braking pressure.

2 Claims, 4 Drawing Figures

HYDRAULIC ANTI-SKID APPARATUS FOR AUTOMOTIVE VEHICLES

BACKGROUND OF THE INVENTION

The present invention relates to a hydraulic anti-skid apparatus for installation in a vehicle braking system between a master cylinder and a wheel brake cylinder to prevent the road wheels of the vehicle from locking in braking operation.

As one of such anti-skid apparatuses as described above, there has been proposed an anti-skid apparatus which comprises a cut-off valve disposed within a braking circuit connecting a master cylinder to a wheel brake cylinder, a bypass valve disposed within a bypass passage of the braking circuit, first and second pistons respectively arranged to control opening and closing operations of the cut-off valve and the bypass valve, the first and second piston each being arranged to be applied at one end thereof with a hydraulic braking pressure from the master cylinder and at the other end thereof with a hydraulic power pressure from a fluid pump, a solenoid valve arranged to be activated when a road wheel of the vehicle tends to be locked in braking operation, the solenoid valve being adapted to apply the hydraulic power pressure to the first piston in its deenergized condition and to connect the first piston to a fluid reservoir in its energized condition, and a regulator valve arranged to control the hydraulic power pressure applied to the first and second pistons in accordance with the hydraulic braking pressure applied thereto from the master cylinder.

In the above-described conventional anti-skid apparatus, the first and second pistons may not be maintained in their initial positions during deactivation of the fluid pump. If the master cylinder is actuated during deactivation of the fluid pump, the first and second pistons are displaced from their initial positions by the hydraulic braking pressure to cause abnormal operations of the cut-off valve and the bypass valve. For this reason, the fluid pump must be always driven during travel of the vehicle. This results in lose of the power and a decrease in the life-span of the fluid pump. Furthermore, in the conventional anti-skid apparatus, the first piston is moved backward by the hydraulic braking pressure when connected to the fluid reservoir in response to energization of the solenoid valve, and subsequently the first piston is rapidly supplied with pressurized fluid from the regulator valve in response to deenergization of the solenoid valve. This causes pressure pulsation in the regulator valve and the master cylinder, resulting in unpleasant shocks on the brake pedal.

SUMMARY OF THE INVENTION

It is, therefore, a primary object of the present invention to provide an improved hydraulic anti-skid apparatus wherein the regulator valve acts to produce a hydraulic pressure when applied with the hydraulic braking pressure from the master cylinder during deactivation of the fluid pump thereby to maintain the first and second pistons in their initial positions.

A secondary object of the present invention is to provide an improved hydraulic anti-skid apparatus, having the above-described characteristic, capable of decreasing pressure pulsation in the regulator valve and the master cylinder in braking operation.

According to the present invention, the primary object is accomplished by providing a hydraulic anti-skid apparatus wherein the regulator valve comprises a booster piston assembly having a small diameter portion applied with the hydraulic power pressure from the fluid pump and a large diameter portion applied with the hydraulic braking pressure from the master cylinder, and an exhaust valve assembled with the booster piston assembly to connect the small diameter portion of the booster piston assembly to the fluid reservoir when the hydraulic power presure exceeds a predetermined value higher than the hydraulic braking pressure, and wherein a check valve is arranged to permit the flow of presurized fluid supplied from the fluid pump to the regulator valve and to block the flow of pressurized fluid from the regulator valve to the fluid pump.

The secondary object of the present invention is accomplished by provision of restriction means disposed within a hydraulic circuit connecting the master cylinder to the regulator valve to throttle the flow of pressurized fluid supplied from the master cylinder to the large diameter portion of the booster piston assembly.

BRIEF DESCRIPTION OF THE DRAWINGS

Additional objects, features and advantages of the present invention will become readily apparent from the following detailed description of a preferred embodiment thereof when taken together with the accompanying drawings, in which.

DETAILED DESCRIPTION OF THE PREFERRED EMBODIMENT

Figure 1:
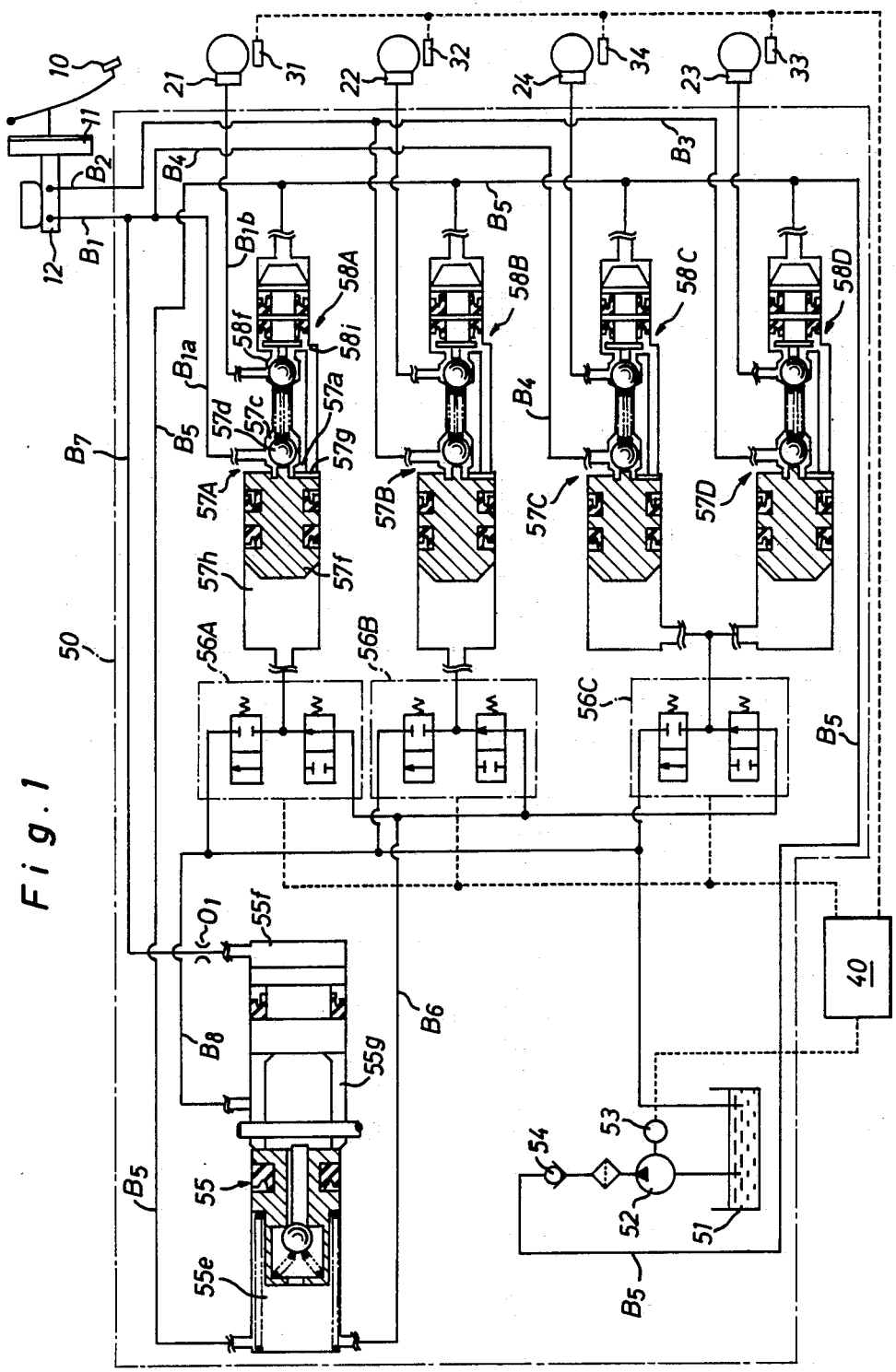
FIG. 1 is a schematic illustration of a hydraulic anti-skid apparatus in accordance with the present invention.

Referring now to the drawings, particularly in FIG. 1, there is schematically illustrated a braking system for automotive vehicles which includes a tandem master cylinder 12 equipped with a booster 11 to be activated by depression of a brake pedal 10. The tandem master cylinder 12 has a front pressure chamber connected to a left-hand front wheel brake cylinder 21 by way of a hydraulic circuit $B_1$ and connected to a right-hand rear wheel brake cylinder 24 by way of a bypass circuit $B_4$ of the hydraulic circuit $B_1$. The tandem master cylinder 12 has a rear pressure chamber connected to a right-hand front wheel brake cylinder 22 by way of a hydraulic circuit $B_2$ and connected to a left-hand rear wheel brake cylinder 23 by way of a bypass circuit $B_3$ of the hydraulic circuit $B_2$. Disposed within the hydraulic circuits $B_3$ and $B_4$ is a well known proportioning valve (not shown), respectively.

In the above-described arrangement of the hydraulic circuits, the braking system includes an anti-skid apparatus 50 for independently controlling the braking pressures applied to the wheel brake cylinders 21, 22, 23 and 24. The anti-skid apparatus 50 comprises wheel lock sensors 31, 32, 33 and 34 for detecting the rotational speed of the respective road wheels, and a computer 40 for producing an electric control signal therefrom in dependence upon each value of electric signals from the wheel lock sensors. The anti-skid apparatus 50 further comprises a fluid reservoir 51, a high pressure two-stage pump 52, an electric motor 53, a check valve 54, a regulator valve 55, solenoid valves 56A-56C, cut-off valves 57A-57D of the piston type, and bypass valves 58A-58D which are assembled within a common housing body 50A as described in detail later.

Figure 2:
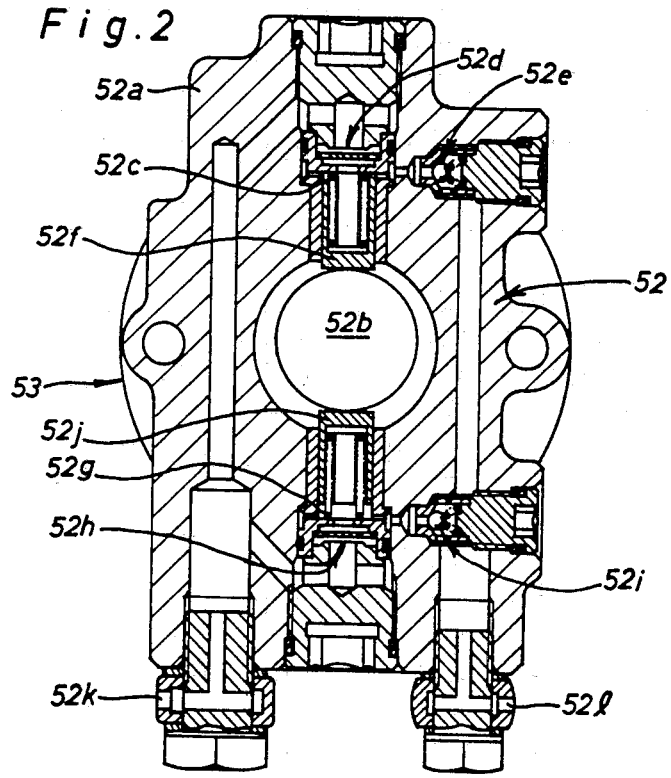
FIG. 2 is an enlarged sectional view of a fluid pump shown in FIG. 1.

The fluid reservoir 51 is arranged to store an amount of hydraulic fluid to be supplied to the bypass valves 58A-58D and the regulator valve 55 by way of a hydraulic circuit $B_5$ and to the solenoid valves 56A-56C by way of a hydraulic circuit $B_6$ extended from the hydraulic circuit $B_5$. The high pressure two-stage pump 52 is arranged to be driven by the electric motor 53 for producing a hydraulic power pressure. The check valve 54 is disposed within the hydraulic circuit $B_5$ to permit the flow of fluid under pressure supplied from the two-stage pump 52 to the bypass valves 58A-58D, regulator valve 55, and solenoid valves 56A-56C. As shown in FIG. 2, the high pressure two-stage pump 52 comprises a pump housing 52a integral with the housing body 50A, a cam shaft 52b rotatably mounted within the pump housing 52a to be driven by the electric motor 53, a plunger 52f arranged to be reciprocated by engagement with the cam shaft 52b under load of a spring 52c, and a pair of check valves 52d and 52e arranged to cooperate with the plunger 52f for operating it as a low pressure pump. The two-stage pump 52 further comprises a plunger 52j arranged to be reciprocated by engagement with the cam shaft 52b under load of a spring 52g, and a pair of check valves 52h and 52i arranged to cooperate with the plunger 52j for operating it as a high pressure pump. The pump housing 52a is provided with an inlet port 52k in connection to the fluid reservoir 51, and an outlet port 52l in connection to the hydraulic circuit $B_5$.

Figure 3:
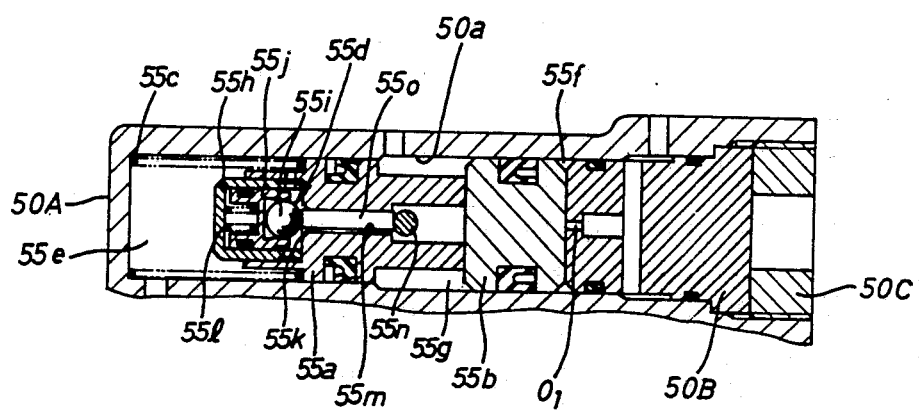
FIG. 3 is an enlarged sectional view of a regulator valve shown in FIG. 1.

The regulator valve 55 is disposed between the hydraulic circuits $B_5$ and $B_6$. As shown in FIG. 3, the regulator valve 55 comprises a booster piston assembly including small and large diameter pistons 55a and 55b axially slidably disposed within a cylinder bore 50a in a portion of the housing body 50A and loaded by a spring 55c rightward, an exhaust valve assembly 55d, and a closure plug 50B disposed within an opening end of the cylinder bore 50a and fixed in place by a fastening nut 50C. The booster piston assembly is adapted to subdivide the interior of cylinder bore 50a into a power pressure chamber 55e and a braking pressure chamber 55f. The power pressure chamber 55e is formed at the left side of small diameter piston 55a and is communicated with the bypass valves 58A-58D and check valve 54 through the hydraulic circuit $B_5$ and with the solenoid valves 56A-56C through the hydraulic circuit $B_6$. The braking pressure chamber 55f is formed at the right side of large diameter piston 55b and is communicated with the front pressure chamber of master cylinder 12 through a bypass circuit $B_7$ of the hydraulic circuit $B_1$. Formed between the small and large diameter pistons 55a and 55b is a drain chamber 55g which is communicated with the fluid reservoir 51 through an exhaust circuit $B_8$ (see FIG. 1)

The exhaust valve assembly 55d includes a retainer casing 55h fixed to the left end of small diameter piston 55a, a holder 55j axially slidably disposed within the retainer casing 55h and loaded by a spring 55l toward the drain chamber 55g, a ball valve 55i received by the holder 55j to cooperate with a valve seat 55k formed at the left end of small diameter piston, and a rod 55o axially slidably disposed within a through hole 55m in piston 55a. In such arrangement of the exhaust valve assembly 55d, the interior of retainer casing 55h is communicated with the power pressure chamber 55e through radial openings formed in the peripheral wall of retainer casing 55h and the left end of piston 55a, and the rod 55o is chamfered at one side thereof to form a communication passage between the interior of retainer casing 55h and the drain chamber 55g. The rod 55o is engaged at its one end with the ball valve 55i and at its other end with a lateral pin 55n fixed to the housing body 50A. Thus, the rod 55o acts to separate the ball valve 55i from the valve seat 55k against the load of spring 55l. The closure plug 50B is formed therein with an orifice $O_1$ which is arranged in the hydraulic bypass circuit $B_7$ to throttle the flow of fluid supplied into the braking pressure chamber 55f.

In operation of the regulator valve 55, the power pressure chamber 55e is applied with a hydraulic power pressure through the check valve 54 during activation of the two-stage pump 52, while the braking pressure chamber 55f is applied with a hydraulic braking pressure from the master cylinder 12 through the orifice $O_1$ in response to depression of the brake pedal 10. When the brake pedal 10 is depressed during deactivation of the two-stage pump 52, the booster piston assembly is moved against the load of spring 55c by the hydraulic braking pressure applied to the braking pressure chamber 55f. Thus, the regulator valve 55 acts to cooperate with the check valve 54 in response to leftward movement of the booster piston assembly thereby to produce a hydraulic pressure in power pressure chamber 55e at a higher value than the braking pressure. When the brake pedal 10 is depressed during activation of the two-stage pump 52, the booster piston assembly is moved in accordance with the difference in pressure between pressure chambers 55e and 55f. When the pressure in chamber 55e increases higher than the pressure in chamber 55f, the exhaust valve assembly 55d acts to permit the flow of fluid from the power pressure chamber 55e to the drain chamber 55g. Thus, the regulator valve 55 acts to control the hydraulic power pressure in chamber 55e in accordance with the hydraulic braking pressure applied to chamber 55f.

Figure 4:
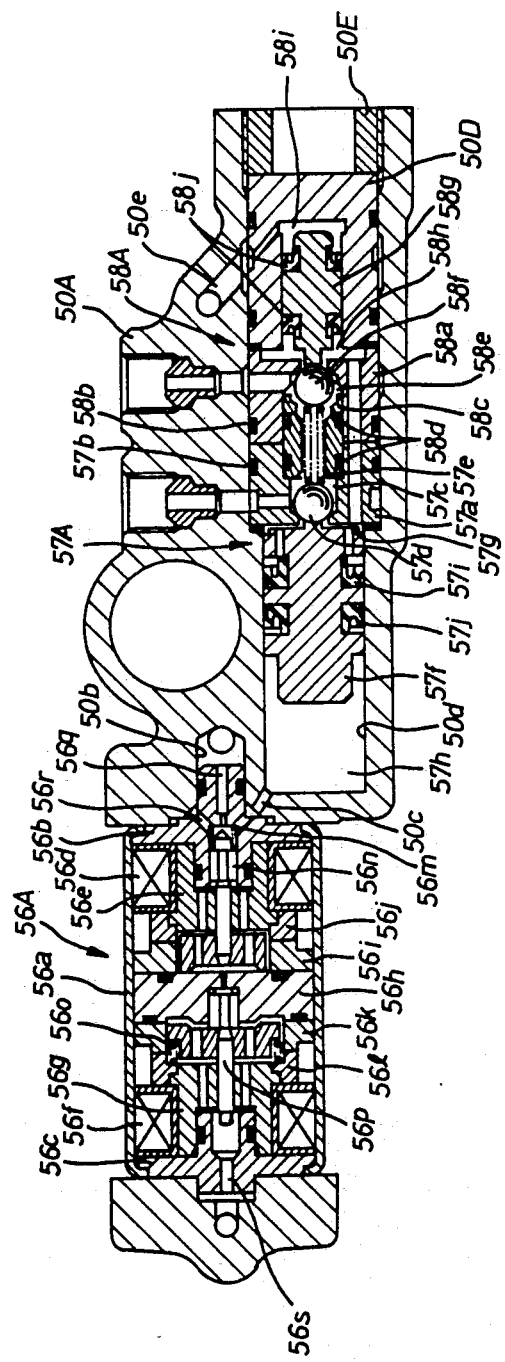
FIG. 4 is an enlarged sectional view of a solenoid valve, a cut-off valve and a bypass valve shown in FIG. 1.

The solenoid valve 56A is energized in response to the electric control signal from the computer 40 to control the hydraulic power pressure applied to the cut-off valve 57A through the regulator valve 55. As shown in FIG. 4, the solenoid valve 56A comprises a cylindrical casing 56a, a pair of axially spaced stationary yokes 56b and 56c fixedly coupled with the opposite ends of casing 56a, a pair of axially spaced solenoid windings 56d and 56f wound around a pair of axially spaced bobbins, a pair of axially spaced stationary cores 56e and 56g respectively coupled with the bobbins, a valve plate 56h interposed between the solenoid windings 56d and 56f respectively through annular yoke members 56i, 56j and 56k, 56l, a movable valve core 56n slidably disposed within an axial bore in stationary core 56e and being loaded leftward by a compression spring 56m to be attracted rightward in energization of the solenoid winding 56d, and a movable valve core 56p slidably disposed within an axial hole in stationay core 56g and being loaded rightward by a compression spring 56o to be attracted leftward in energization of the solenoid winding 56f. The stationary yoke 56b is formed with an inlet port 56q and a radial port 56r, while the stationary yoke 56c is formed with an exhaust port 56s which is communicated with the fluid reservoir 51 through the exhaust circuit $B_8$. (see FIG. 1) The stationary yoke $56b$ of solenoid valve 56A is fluid-tightly coupled at its outer end within a bore $50b$ of the housing body 50A which is communicated with the power pressure chamber $55e$ of regulator valve 55 through the hydraulic circuit $B_6$. (see FIG. 1)

During deenergization of both the solenoid windings $56d$ and $56f$, the movable valve core $56n$ is disengaged from a seat protion of stationary yoke $56b$ under the load of spring $56m$, while the movable valve core $56p$ is maintained in engagement with a seat portion of valve plate $56h$ under the load of spring $56o$. In such a condition, the inlet port $56q$ of solenoid valve 56A is communicated with a passage $50c$ in the housing body 50A through the radial port $56r$ and blocked from the exhaust port $56s$. When both the solenoid windings $56d$, $56f$ are energized, the movable valve core $56n$ is attracted rightward against spring $56m$ to engage the seat portion of yoke $56b$, while the movable valve core $56p$ is attracted leftward against spring $56o$ to disengage from the seat portion of valve plate $56h$. Thus, the passage $50c$ is blocked from the inlet port $56q$ of solenoid valve 56A and is communicated with the exhaust port $56s$ through the radial port $56r$ and axial passages in stationary core $56e$, valve plate $56h$ and stationary core $56g$.

The solenoid valve 56B is arranged to be energized in response to the electric control signal from computer 40 for controlling the hydraulic power pressure applied to the cut-off valve 57B therethrough from the regulator valve 55, and the solenoid 56C is arranged to be energized in response to the electric control signal from computer 40 for controlling the hydraulic power pressure applied to the cut-off valves 57C and 57D therethrough from the regulator valve 55. The solenoid valves 56B and 56C are arranged in parallel with the solenoid valve 56A within the common housing body 50A and connected at their inlet ports to the hydraulic circuit $B_6$ and at their exhaust ports to the exhaust circuit $B_8$. The construction of the respective solenoid valves 56B and 56C is substantially the same as that of the solenoid valve 56A.

As shown in FIG. 4, the cut-off valve 57A is associated with the bypass valve 58A coaxially within a common cylinder bore $50d$ which is formed in the housing body 50A and closed by a closure plug 50D fastened in place by a nut 50E with a hexagon socket. The cut-off valve 57A comprises a valve seat member $57a$ fixedly coupled within the cylinder bore $50d$ through an annular seal member $57b$ to form a valve chamber $57c$, a ball valve $57d$ contained within the valve chamber $57c$, and a piston $57f$ axially slidably disposed within the cylinder bore $50d$ to form a braking pressure chamber $57g$ and a power pressure chamber $57h$. The piston $57f$ is provided in its outer circumference with a pair of axially spaced annular cup seal members $57i$ and $57j$.

The bypass valve 58A comprises a valve seat member $58a$ fixedly coupled within the cylinder bore $50d$ through an annular seal member $58b$ and fitted to the valve seat member $57a$ to form a valve chamber $58e$, a ball valve $58f$ contained within the valve chamber $58e$, a tubular valve seat member $58c$ fixedly coupled within the valve seat members $57a$ and $58a$ through a pair of axially spaced annular seal members $58d$, $58d$ to form a bypass passage, a compression coil spring $57e$ contained within the tubular valve seat member $58c$ and being engaged at the opposite ends thereof with the ball valves $57d$ and $58f$, and a piston $58g$ axially slidably disposed within a counter bore in the closure plug 50D through a pair of axially spaced annular seal members $58j$, $58j$ to form a braking pressure chamber $58h$ and a power pressure chamber $58i$. In the assembly of cut-off valve 57A and bypass valve 58A, the valve chamber $57c$ is connected to a first part $B_{1a}$ of the hydraulic circuit $B_1$ in connection to the master cylinder 12, the valve chamber $58e$ is connected to a second part $B_{1b}$ of the hydraulic circuit $B_1$ in connection to the wheel brake cylinder 21, and the power pressure chamber $58i$ is connected to the hydraulic circuit $B_5$ through a port $50e$.

In operation, when the power pressure chamber $57h$ of cut-off valve 57A is applied with the power pressure from the two-stage pump 52 by way of the check valve 54, regulator valve 55 and solenoid valve 56A, the piston $57f$ is urged rightward to disengage the ball valve $57d$ from a seat portion of member $57a$, and the piston $58g$ is urged leftward by the power pressure applied thereto in chamber $58i$ to engage the ball valve $58f$ with a seat portion of the tubular seat member $58c$ against the compression coil spring $57e$. In such a condition, the valve chamber $57c$ is communicated with the valve chamber $58e$ through the braking pressure chamber $57g$, axial holes in valve seat members $57a$ and $58a$, and braking pressure chamber $58h$ to permit the flow of pressurized fluid between the first and second parts of the hydraulic circuit $B_1$, and the piston $57f$ is maintained in engagement with the left end of valve seat member $57a$ to minimize the capacity of braking pressure chamber $57g$.

When the solenoid valve 56A is energized to connect the power pressure chamber $57h$ to the fluid reservoir 51 therethrough, the piston $57f$ is moved leftward by a hydraulic braking pressure applied thereto in chamber $57g$, and in turn, the ball valve $57d$ engages the seat portion of member $57a$ to block the communication between the valve chamber $57c$ and the braking pressure chamber $57g$. Thus, the first part $B_{1a}$ of hydraulic circuit $B_1$ is disconnected from the second part $B_{1b}$ of hydraulic circuit $B_1$, and subsequently the capacity of braking pressure chamber $57g$ is increased by the leftward movement of piston $57f$ to decrease the braking pressure applied to the wheel brake cylinder 21.

If the power pressure drops below a predetermined value due to damage of the pump 52, motor 53, hydraulic circuit $B_5$ or the like, the piston $58g$ of bypass valve 58A will be applied with the braking pressure through the chamber $57g$ of cut-off valve 57A prior to engagement of the ball valve $57d$ with the seat portion of member $57a$. Thus, the piston $58g$ will be moved rightward by the difference in pressure between chambers $58h$ and $58i$ so that the ball valve $58f$ is disengaged from the seat portion of tubular seat member $58c$ to permit a bypass flow of pressurized fluid across the tubular seat member $58c$ between the valve chambers $57c$ and $58e$. In such a condition, the ball valve $58f$ is engaged with a seat portion of member $58a$ to block a reverse flow of the pressurized fluid from the valve chamber $58e$ to the braking pressure chamber $58h$.

The cut-off valves 57B, 57C and 57D are arranged in parallel with the cut-off valve 57A within the common housing body 50A and associated with the bypass valves 58B, 58C and 58D respectively in the same manner as described above. The construction and function of the cut-off valves 57B, 57C and 57D are substantially the same as those in the cut-off valve 57A, and also the contruction and function of the bypass valves 58B, 58C and 58D are substantially the same as those in the bypass valve 58A. (see FIG. 1)

The computer 40 is responsive to the electric signals from the wheel lock sensors 31, 32, 33 and 34 to detect the rotation of the respective road wheels in braking operation. Assuming that the left-hand front road wheel tends to be locked in the braking operation, the solenoid valve 56A is energized by an electric control signal from the computer 40 to exhaust the power pressure from the chamber 57$h$ of cut-off valve 57A into the fluid reservoir 51. Thus, the cut-off valve 57A acts to block the communication between the first and second parts of hydraulic circuit B$_1$ so as to decrease the braking pressure in the wheel brake cylinder 21. When the road wheel is released from the tendency to be locked, the solenoid valve 56A is deenergized under control of the computer 40 such that the chamber 57$h$ of cut-off valve 57A is applied with the hydraulic power pressure through the solenoid valve 56A to permit the flow of pressurized fluid between the first and second parts of hydraulic circuit B$_1$ thereby to increase the braking pressure in the wheel brake cylinder 21. Subsequently, the solenoid valve 56A is alternatively energized and deenergized under control of the computer 40 to control the braking pressure in the wheel brake cylinder 21 so as to prevent the road wheel from locking during braking.

Assuming that the above-described braking operation has been conducted under deactivated condition of the pump 52, the booster piston assembly in regulator valve 55 is moved leftward against the load of spring 55$c$ by the hydraulic braking pressure applied to the chamber 55$f$ through the orifice O$_1$. Thus, the regulator valve 55 acts to cooperate with the check valve 54 in response to leftward movement of the booster piston assembly thereby to produce a hydraulic pressure in power pressure chamber 55$e$ at a higher value than the braking pressure. As a result, in the initial stage of the braking operation, the piston 57$f$ of cut-off valve 57A and the piston 58$g$ of bypass valve 58A are maintained in their initial positions by the hydraulic pressure applied thereto from the power pressure chamber 55$e$ of regulator valve 55. This means that even when the pump 52 is activated in response to depression of the brake pedal 10 to produce the power pressure prior to energization of the solenoid valves 56A-56C, the cut-off valves 57A-57D and the bypass valves 58A-58D are conditioned to normally control the braking pressure applied to the wheel brake cylinders 21-24. For this reason, it is able to eliminate unneccessary activation of the pump 52 during travel of the vehicle. It is further noted that when the solenoid valve 56A is deenergized to permit the hydraulic power pressure applied therethrough to the chamber 57$h$ of cut-off valve 57A, the orifice O$_1$ in regulator valve 55 acts to throttle the flow of fluid supplied to the braking pressure chamber 55$f$ from the master cylinder 12. This is effective to restrain pressure pulsation acting on the master cylinder 12.

From the above description, it will be understood that in the actual practices of the present invention, the electric motor 53 may be energized in response to depression of the brake pedal 10 under control of the computer 40 to activate the two-stage motor 52 prior to energization of the solenoid valves 56A-56C.

Having now fully set forth both structure and operation of a preferred embodiment of the concept underlying the present invention, various other embodiments as well as certain variations and modifications of the embodiment herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A hydraulic anti-skid apparatus for installation in a vehicle braking system between a master cylinder and a wheel brake cylinder, comprising:
    a fluid reservoir arranged to store an amount of hydraulic fluid;
    a fluid pump connected to said reservoir to produce a hydraulic power pressure;
    a cut-off valve disposed within a braking circuit connecting said master cylinder to said wheel brake cylinder;
    a bypass valve disposed within a bypass passage of the braking circuit;
    first and second pistons respectively arranged to control opening and closing operations of said cut-off valve and said bypass valve, said first and second pistons each being arranged to be applied at one end thereof with a hydraulic braking pressure from said master cylinder and at the other end thereof with the hydraulic power pressure from said fluid pump wherein said first and second pistons are maintained, in an initial stage of braking operation, in initial positions;
    a changeover valve arranged to be activated when a road wheel of the vehicle tends to be locked in braking operation, said changeover valve being adapted to apply the hydraulic power pressure to said first piston in its deactivated condition and to connect said first piston to said fluid reservoir in its activated condition; and
    a regulator valve arranged to control the hydraulic power pressure applied to said first and second pistons in accordance with the hydraulic braking pressure applied thereto from said master cylinder; and
    a check valve arranged to permit the flow of pressurized fluid supplied from said fluid pump to said regulator valve and to block the flow of pressurized fluid from said regulator valve to said fluid pump; and
    restriction means disposed within a hydraulic circuit connecting said master cylinder to said regulator valve to throttle the flow of pressurized fluid supplied from said master cylinder to said regulator valve.

2. A hydraulic anti-skid apparatus as claimed in claim 1, wherein said regulator valve comprises a booster piston assembly having a small diameter portion applied with the hydraulic power pressure from said fluid pump through said check valve and a large diameter portion applied with the hydraulic braking pressure from said master cylinder through said restriction means, and an exhaust valve assembled with said booster piston assembly to connect the small diameter portion of said booster piston assembly to said fluid reservoir therethrough when the hydraulic power pressure exceeds a predetermined value higher than the hydraulic braking pressure, and wherein said restriction means is in the form of an orifice provided within said regulator valve to throttle the flow of pressurized fluid supplied from said master cylinder to the large diameter portion of said booster piston assembly.

* * * * *